(12) United States Patent
Goncharov et al.

(10) Patent No.: US 11,769,522 B2
(45) Date of Patent: Sep. 26, 2023

(54) MAMR RECORDING HEAD WITH SAF TRAILING SHIELD NOTCH AND/OR BUMP

(71) Applicant: Western Digital Technologies, Inc., San Jose, CA (US)

(72) Inventors: Alexander Goncharov, Morgan Hill, CA (US); Muhammad Asif Bashir, San Jose, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/345,972

(22) Filed: Jun. 11, 2021

(65) Prior Publication Data

US 2022/0399035 A1     Dec. 15, 2022

(51) Int. Cl.
| | | |
|---|---|---|
| *G11B 5/235* | (2006.01) | |
| *G11B 5/31* | (2006.01) | |
| *G11B 5/127* | (2006.01) | |
| *G11B 5/00* | (2006.01) | |

(52) U.S. Cl.
CPC .......... *G11B 5/235* (2013.01); *G11B 5/1278* (2013.01); *G11B 5/314* (2013.01); *G11B 5/3133* (2013.01); *G11B 5/3146* (2013.01); *G11B 5/3116* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,274,811 B2 | 9/2012 | Zhang et al. | |
| 8,922,949 B1 * | 12/2014 | Koui et al. | G11B 5/235 360/125.3 |
| 9,064,508 B1 | 6/2015 | Shiimoto et al. | |
| 9,208,801 B2 | 12/2015 | Zhang et al. | |
| 9,355,655 B1 * | 5/2016 | Udo et al. | G11B 5/235 |

(Continued)

OTHER PUBLICATIONS

Matsubara, Masato et al., "Experimental feasibility of spin-torque oscillator with synthetic field generation layer for microwave assisted magnetic recording", Journals of Applied Physics, vol. 109, Issue 7, Mar. 31, 2011, https://aip.scitation.org/doi/abs/10.1063/1.3559539?journalCode=jap.

(Continued)

*Primary Examiner* — Craig A. Renner
(74) *Attorney, Agent, or Firm* — PATTERSON + SHERIDAN, LLP; Steven H. VerSteeg

(57) ABSTRACT

The present disclosure generally relates to a magnetic media drive employing a magnetic recording head. The magnetic recording head comprises a main pole (MP), a trailing shield (TS), a trailing gap (TG) disposed between the MP and the TS, and a spin torque oscillator (STO) disposed in the TG adjacent to the MP. A notch may be disposed in the TG between the STO and TS. The notch comprises one or more notch interlayers comprising a non-magnetic material and/or a magnetic material. A bump may be disposed in the TG between the TS and the STO or the notch. The bump comprises one or more bump interlayers comprising a non-magnetic material. A hot seed layer may be coupled to the TS adjacent to the bump, the notch, or the STO. The hot seed layer comprises one or more hot seed interlayers comprising a non-magnetic material.

22 Claims, 12 Drawing Sheets

(56) References Cited

U.S. PATENT DOCUMENTS

| | | |
|---|---|---|
| 10,090,007 B2 | 10/2018 | Zhu |
| 10,366,714 B1 * | 7/2019 | Olson et al. ............ G11B 5/314 |
| 10,762,917 B1 * | 9/2020 | Le et al. .............. G11B 5/1278 |
| 10,839,831 B1 * | 11/2020 | Nguyen et al. ......... G11B 5/314 |
| 10,839,832 B1 | 11/2020 | Goncharov et al. |
| 10,943,611 B1 * | 3/2021 | Freitag et al. ......... G11B 5/235 |
| 10,950,258 B1 * | 3/2021 | Gao et al. ............ G11B 5/3146 |
| 2011/0279921 A1 * | 11/2011 | Zhang et al. .......... G11B 5/235 |
| | | 360/59 |
| 2012/0113540 A1 | 5/2012 | Zhang et al. |
| 2012/0126905 A1 * | 5/2012 | Zhang et al. ........ G11B 5/3146 |
| | | 427/130 |
| 2016/0042779 A1 | 2/2016 | Wang et al. |
| 2018/0144768 A1 * | 5/2018 | Liu et al. ............. G11B 5/1278 |
| 2019/0244635 A1 * | 8/2019 | Goncharov et al. ... G11B 5/314 |
| 2020/0342899 A1 | 10/2020 | Olson et al. |
| 2021/0217440 A1 * | 7/2021 | Suto et al. ........... G11B 5/3146 |

OTHER PUBLICATIONS

Sepehri-Amin, H. et al., "Design of spin-injection-layer in all-in-plane spin-torque-oscillator for microwave assisted magnetic recording", Journal of Magnetism and Magnetic Materials, vol. 476, Apr. 15, 2019, https://www.sciencedirect.com/science/article/abs/pii/S0304885318335534?via%3Dihub.

* cited by examiner

MAMR RECORDING HEAD WITH SAF TRAILING SHIELD NOTCH AND/OR BUMP

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to confine the magnetic field in the narrow footprint for high density recording. In microwave-assisted magnetic recording (MAMR) heads, the spin torque oscillator (STO) is positioned in the trailing gap (TG) between the main pole and trailing shield. The STO is used for generation of the AC field, which helps to write on the high coercivity recording media. However, in such designs, the AC field may be distorted when writing data, due to the magnetization precession in the trailing shield. As a result, the areal density recording of the magnetic recording head suffers.

The tradeoff between STO frequency and AC field amplitude, which is related to the angle of the magnetization in the field generating layer (FGL), is controlled by the thickness of the trailing gap between the main pole and the trailing shield. The trailing gap thickness affects the magnetic field acting on the STO resulting in the variation of the frequency versus angle dependence. It is beneficial to have an alternative way for adjustment of the deep gap field in the MAMR recording heads without changing significantly the trailing gap.

Therefore, there is a need in the art for a MAMR recording head having an improved and stable trailing shield design, allowing for tuning of the magnetic field in the trailing gap.

SUMMARY OF THE DISCLOSURE

The present disclosure generally relates to a magnetic media drive employing a magnetic recording head. The magnetic recording head comprises a main pole (MP), a trailing shield (TS), a trailing gap (TG) disposed between the MP and the TS, and a spin torque oscillator (STO) disposed in the TG adjacent to the MP. A notch may be disposed in the TG between the STO and TS. The notch comprises one or more notch interlayers comprising a non-magnetic material, and/or a magnetic material. A bump may be disposed in the TG between the TS and the STO or the notch. The bump comprises one or more bump interlayers comprising a non-magnetic material. A hot seed layer (HS) may be coupled to the TS adjacent to the bump, the notch, or the STO. The hot seed layer comprises one or more hot seed interlayers comprising a non-magnetic material. In some embodiments, a purpose of the non-magnetic material is to help enable a synthetic anti-ferromagnetic (SAF) structure in the notch, and/or bump, and/or hot seed.

In one embodiment, a magnetic recording head comprises a main pole, a trailing shield, a trailing gap disposed between the main pole and the trailing shield, a spin torque oscillator disposed adjacent to the main pole in the trailing gap, and a notch disposed between the spin torque oscillator and the trailing shield in the trailing gap, the notch comprising one or more notch interlayers and one or more notch layers, wherein the one or more notch interlayers each individually comprise a non-magnetic material, or a magnetic material. The one or more notch layers comprise a different material than the one or more notch interlayers.

In another embodiment, a magnetic recording head comprises a main pole, a trailing shield, a trailing gap disposed between the main pole and the trailing shield, a spin torque oscillator disposed adjacent to the main pole in the trailing gap at a media facing surface (MFS), and a hot seed layer coupled to the trailing shield adjacent to the trailing gap, the hot seed layer comprising one or more hot seed interlayers and one or more hot seed layers, wherein the one or more hot seed interlayers each individually comprise a non-magnetic material, and wherein each of the one or more hot seed layers comprise a high magnetic moment material.

In yet another embodiment, a magnetic recording head comprises a main pole, a trailing shield, a trailing gap disposed between the main pole and the trailing shield, a spin torque oscillator disposed adjacent to the main pole in the trailing gap, a notch disposed adjacent to the spin torque oscillator in the trailing gap, the notch comprising a non-magnetic material, and a bump disposed between the notch and the spin torque oscillator in the trailing gap, the bump comprising one or more bump interlayers alternating with one or more bump layers, wherein the one or more bump interlayers each individually comprises a non-magnetic material, and wherein the one or more bump layers comprise a different material than the one or more bump interlayers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording head comprises a main pole (MP), a trailing shield (TS), a trailing gap (TG) disposed between the MP and the TS, and a spin torque oscillator (STO) disposed in the TG adjacent to the MP. A notch may be disposed in the TG between the STO and TS. The notch comprises one or more notch interlayers comprising a non-magnetic material, and/or a magnetic material. A bump may be disposed in the TG between the TS and the STO or the notch. The bump comprises one or more bump interlayers comprising a non-magnetic material. A hot seed layer may be coupled to the TS adjacent to the bump, the notch, or the STO. The hot seed layer comprises one or more hot seed interlayers comprising a non-magnetic material.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. An example TED is described in co-pending patent application titled "Tape Embedded Drive," United States Publication. No. 2020/0258544, filed Mar. 26, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 1:
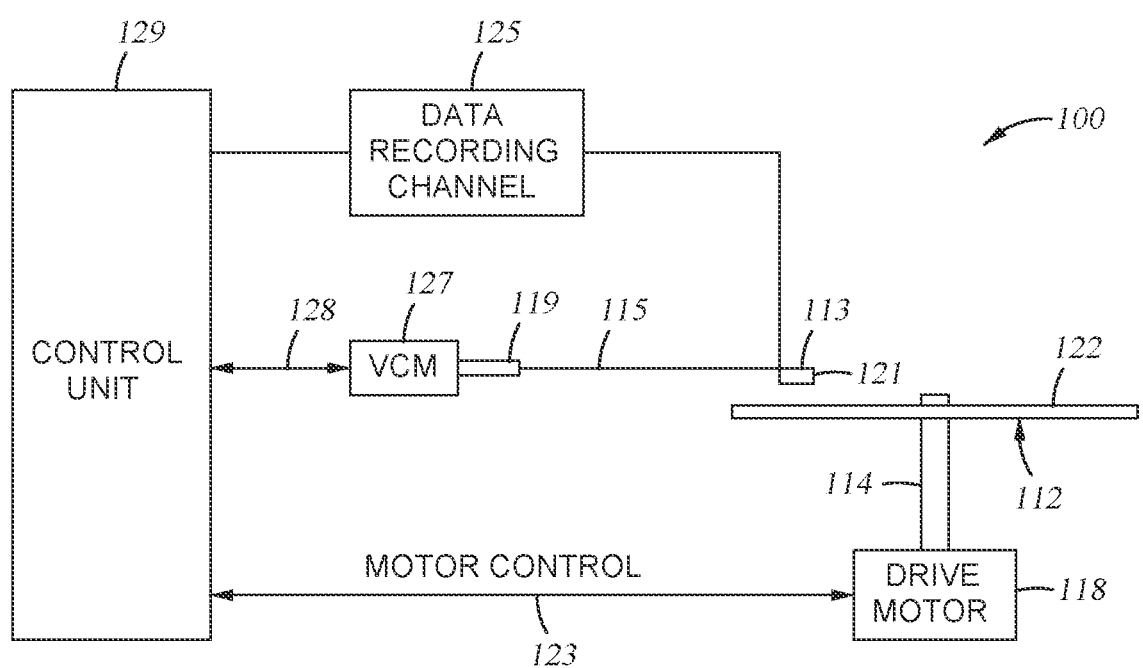
FIG. 1 illustrates a magnetic recording device embodying this disclosure.

FIG. 1 illustrates a magnetic recording device 100 embodying this disclosure. As shown, at least one rotatable magnetic media 112 is supported on a spindle 114 and rotated by a disk drive motor 118. The magnetic recording on each disk is in the form of any suitable pattern of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force that biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
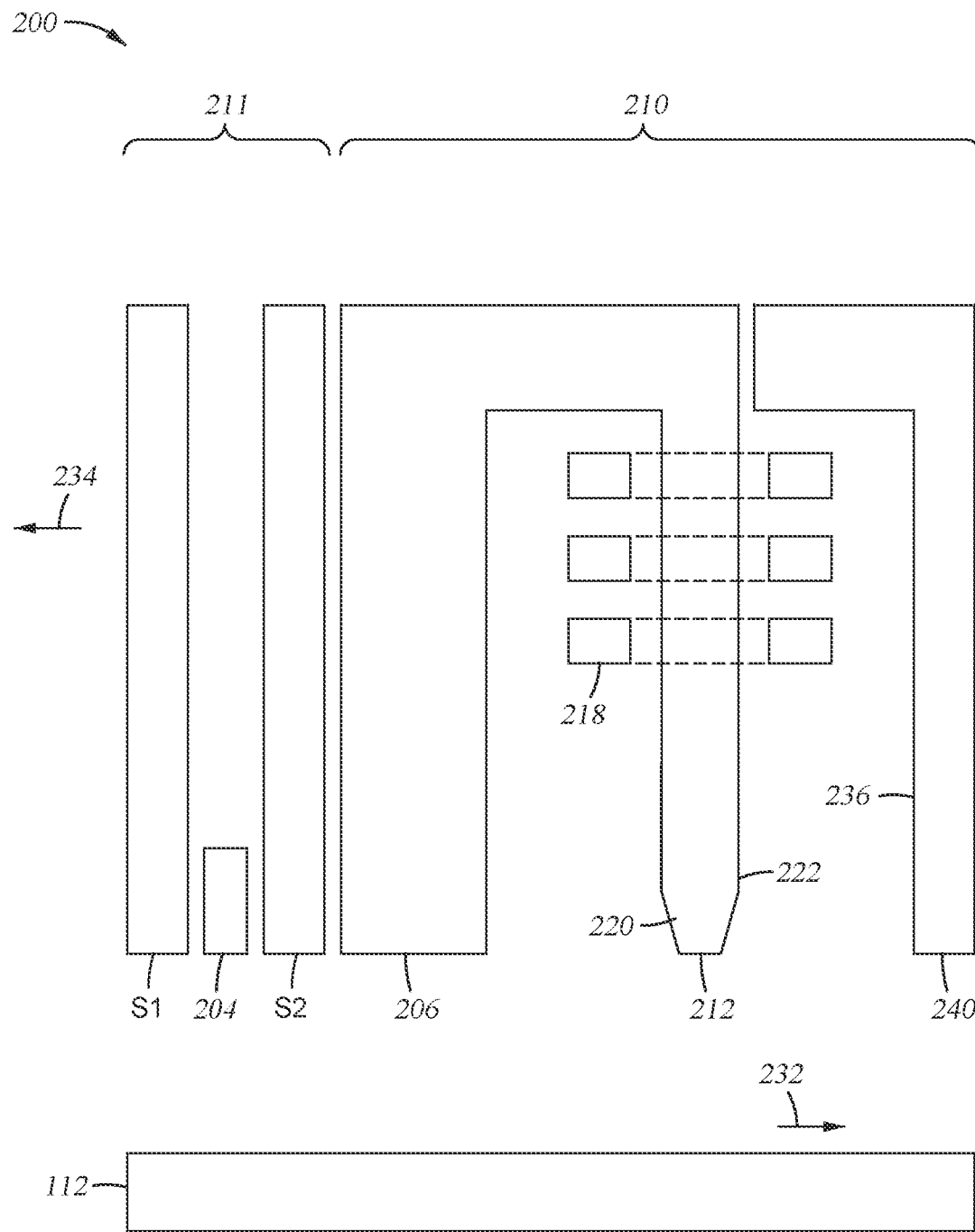
FIG. 2 is a fragmented, cross sectional side view through the center of a read/write head facing the magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni.

Figure 3A:
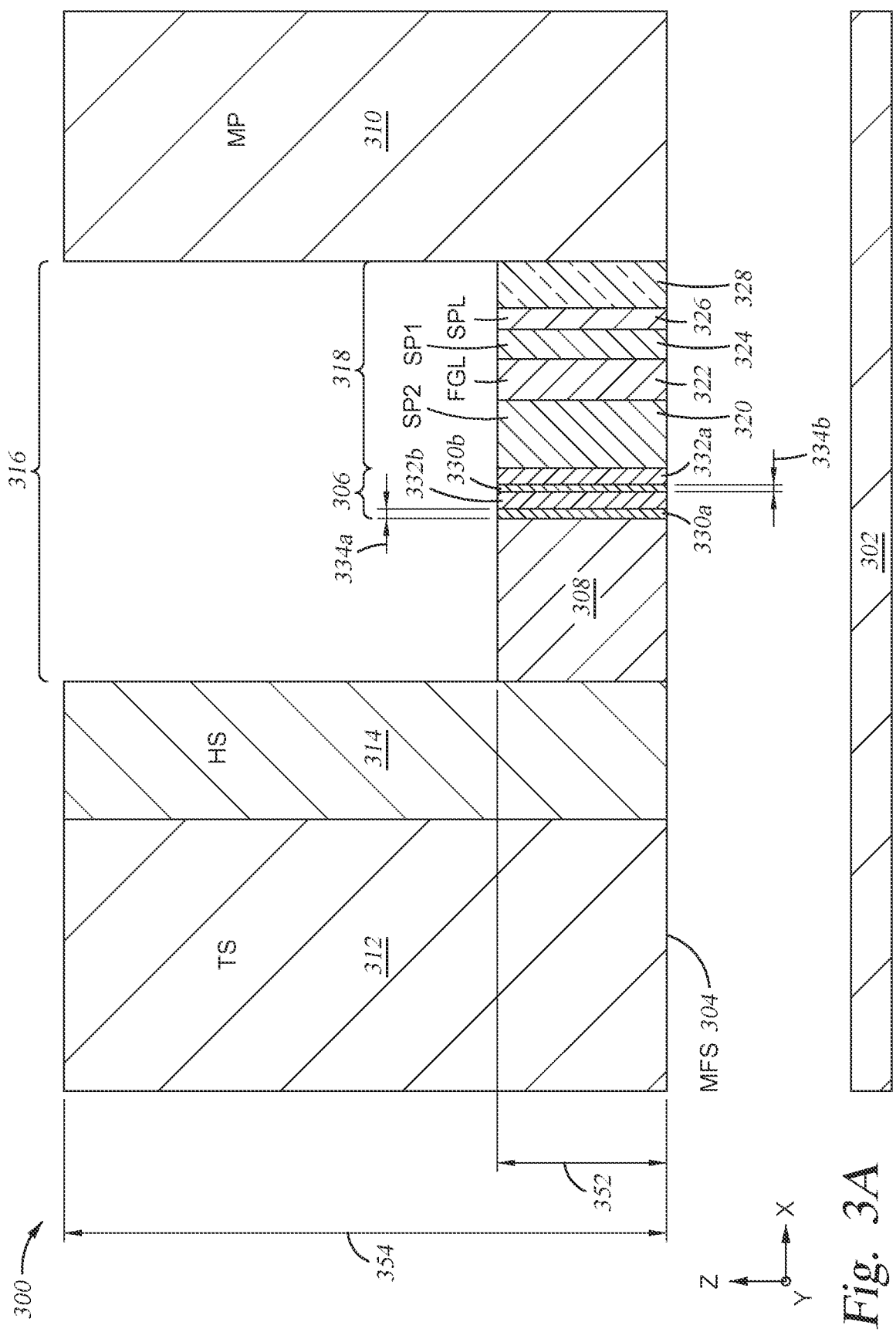
FIGS. 3A-4G illustrate cross-sectional views of magnetic recording heads, according to various embodiments.
Figure 3B:
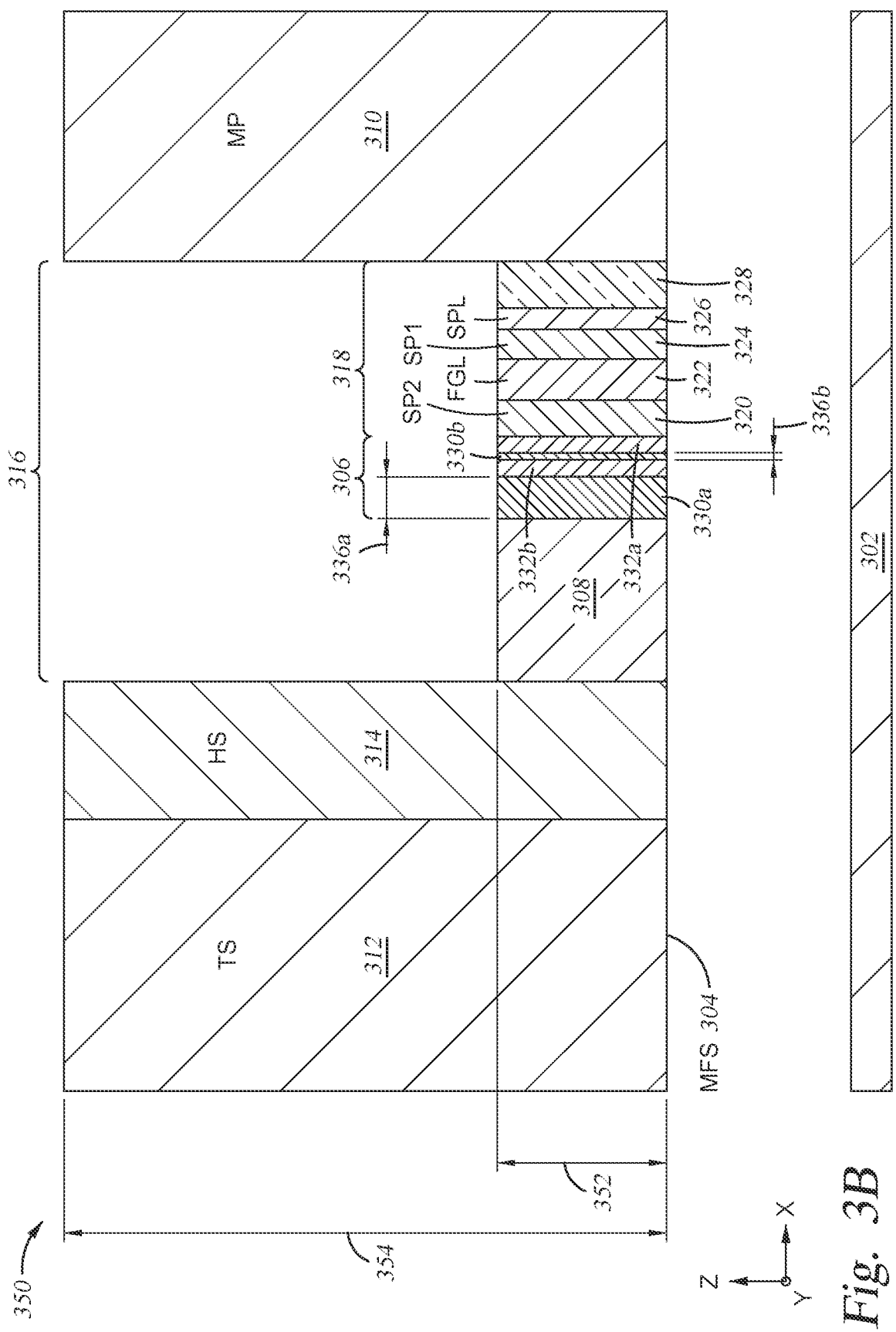
Figure 3C:
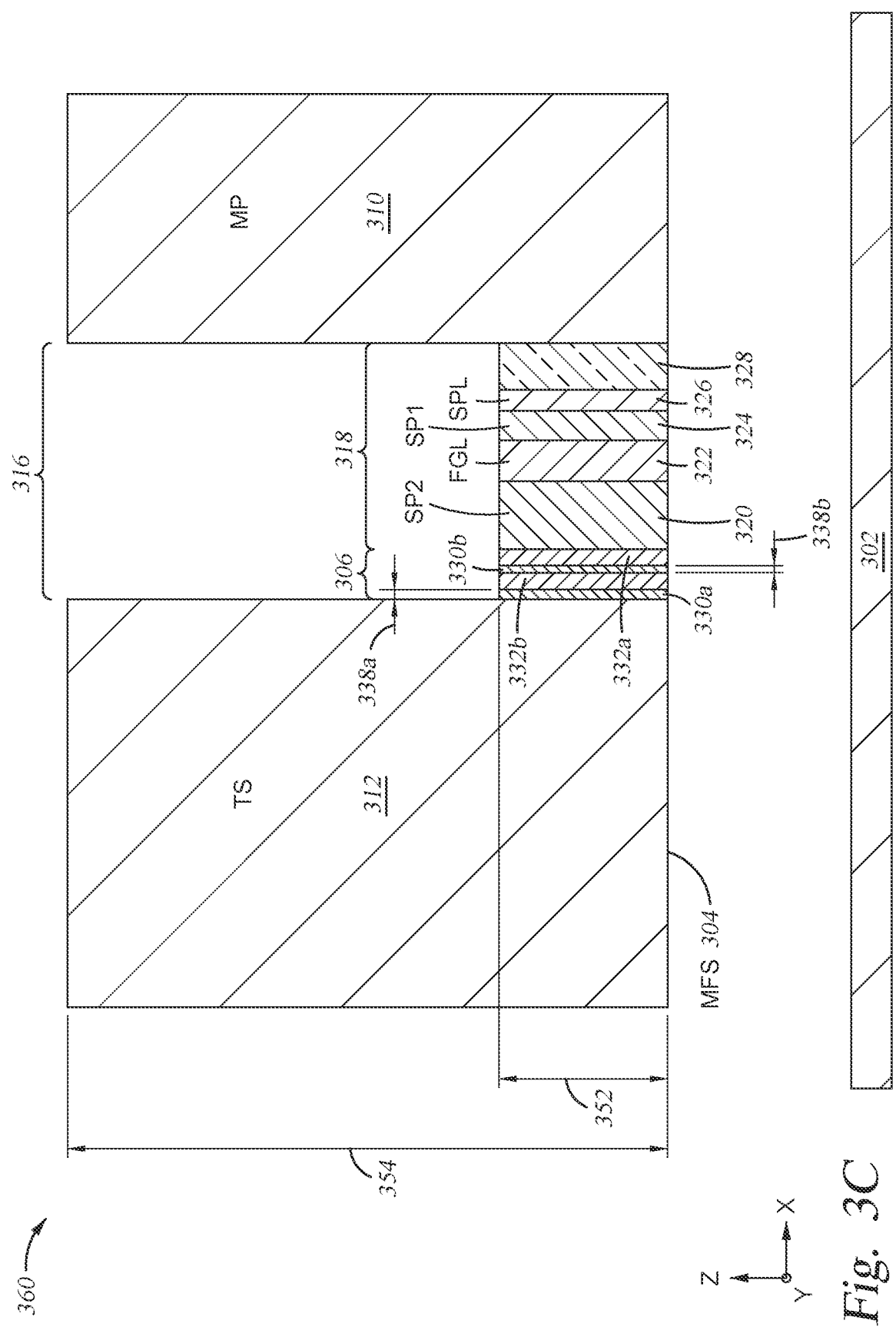

FIGS. 3A-3C illustrate cross-sectional views of magnetic recording heads, according to various embodiments. The magnetic recording heads 300, 350, 360 may independently be the write head 210 of FIG. 2. The magnetic recording heads 300, 350, 360 are each within a magnetic recording device, such as the magnetic recording device 100 of FIG. 1. Moreover, the embodiments of FIGS. 3A-3C may be used in combination with the embodiments of FIGS. 4A-4G, as discussed further below.

Each of the magnetic recording heads 300, 350, 360 of FIGS. 3A-3C and comprises a main pole (MP) 310, a trailing shield (TS) 312, a trailing gap 316 disposed between the main pole 310 and the trailing shield 312, a spin torque oscillator (STO) 318 disposed in the trailing gap 316 adjacent to the main pole 310, and a notch 306 disposed adjacent to the STO 318. Each of the magnetic recording heads 300, 350, 360 comprises a MFS 304 facing a magnetic media 302. The STO 318 comprises a seed layer 328 disposed in contact with the main pole 310, a spin polarization layer (SPL) 326 disposed in contact with the seed layer 328, a first spacer layer (SP1) 324 comprising Cu disposed in contact with the SPL 326, a field generation layer (FGL) 322 disposed in contact with the SPL1 324, and a second spacer layer (SP2) 320 comprising Cu, Ru, Cr, or NiCr disposed in contact with the FGL 322 and the notch 306. The STO 318 has a first height 352 in the z-direction, and the trailing shield 312 has a second height 354 in the z-direction greater than the first height 352. It is noted that the compositions of the STO 318 shown in this and later figures are provided as illustrative examples. Various embodiments of the invention can be applicable to recording heads with STOs of other designs.

In the magnetic recording heads 300 and 350, the trailing shield 312 comprises a trailing shield hot seed (HS) layer 314 disposed adjacent to the trailing gap 316, and a bump 308 disposed adjacent to and in contact with the HS layer 314. In some embodiments, the HS layer 314, the bump 308, and/or the notch 306 are considered part of the trailing shield 312. The HS layer 314 and the bump 308 each individually comprises a high moment magnetic material, such as CoFe alloys, for example. The HS layer 314 and the bump 308 may comprise the same material or a different material. In some embodiments, the bump 308 is doped with a rare earth metal, such as beta phase tantalum, beta phase tungsten, or platinum. The STO 318 has a first height 352 in the z-direction, and the trailing shield 312 has a second height 354 in the z-direction greater than the first height 352. The HS layer 314 has the same second height 354 in the z-direction as the trailing shield 312. The notch 306 and the bump 308 each individually has the same first height 352 in the z-direction as the STO 318.

The notch 306 comprises one or more notch layers 332a, 332b and one or more notch interlayers 330a, 330b. The one or more notch layers 332a, 332b and the one or more notch interlayers 330a, 330b are alternating, where a first notch layer 332a is disposed in contact with the STO 318 and a first notch interlayer 330a is disposed in contact with the bump 308 in FIGS. 3A-3B, or the trailing shield 312 in FIG. 3C. While two notch layers 332a, 332b and two notch interlayers 330a, 330b are shown in FIGS. 3A-3C, the notch 306 may comprise greater or fewer notch layers 332a, 332b and greater or fewer notch interlayers 330a, 330b. As such, the number of notch layers 332a, 332b and the number of notch interlayers 330a, 330b are not intended to be limiting.

The one or more notch layers 332a, 332b each individually comprises a high moment ferromagnetic material, such as CoFe or NiFe. Each of the one or more notch layers 332a, 332b may comprise the same material or a different material. The one or more notch interlayers 330a, 330b each individually comprises a non-magnetic material such as Cr or Ru, or a magnetic material. Each of the one or more notch interlayers 330a, 330b may comprise the same type of material (e.g., magnetic or non-magnetic). In other words, the notch 306 comprises alternating layers of materials. While the one or more notch interlayers 330a, 330b may comprise the same type of material (e.g., magnetic or non-magnetic), the one or more notch interlayers 330a, 300b may still comprises different materials of the same type.

Similarly, each of the one or more notch interlayers 330a, 330b may comprise a different type of material and/or thickness. For example, the first notch interlayer 330a may comprise a non-magnetic material having a thickness adjusted for weak or zero exchange coupling, while the second notch interlayer 330b comprises a non-magnetic material having a thickness adjusted for strong anti-ferromagnetic (AF) coupling, or vice versa; the first notch interlayer 330a may comprise a non-magnetic material having a thickness adjusted for weak (or alternatively strong) AF coupling while the second notch interlayer 330b comprises a magnetic material, or vice versa; or the first notch interlayer 330a may comprise a magnetic material while the second notch interlayer 330b comprises a non-magnetic material having a thickness adjusted for weak (or alternatively strong) AF coupling, or vice versa.

The coupling behavior of the material is caused by the RKKY interaction and is oscillatory in nature. Depending on the thickness of the material used, the exchange interaction can change sign (positive or negative) from ferromagnetic to anti-ferromagnetic coupling and the period of the oscillation depends on the material. For a certain thickness between these maxima and minima, the exchange interaction is close to zero. By adjusting the thickness of the nonmagnetic material, strong anti-ferromagnetic, ferromagnetic, or zero exchange coupling can be achieved. In some embodiments, a purpose of the notch interlayers 330a, 330b is to help emable a synthetic anti-ferromagnetic (SAF) structure in the notch 306.

As shown in FIG. 3A, the first notch interlayer 330a disposed in contact with the bump 308 has a first thickness 334a in the x-direction, and the second notch interlayer 330b disposed in between the first and second notch layers 332a, 332b has a second thickness 334b in the x-direction. The first thickness 334a and the second thickness 334b are each individually between about 0.5 nm to about 10 nm. In some embodiments, the first thickness 334a and the second thickness 334b are about equal.

In FIG. 3B, the first notch interlayer 330a disposed in contact with the bump 308 has a first thickness 336a in the x-direction, and the second notch interlayer 330b disposed in between the first and second notch layers 332a, 332b has a second thickness 336b in the x-direction. The first thickness 336a is between about 0.5 nm to about 10 nm, and the second thickness 336b is between about 0.5 nm to about 1 nm. In the magnetic recording head 350 of FIG. 3B, the first notch interlayer 330a has a greater first thickness 336a than the second thickness 336b of the second notch interlayer 330b.

Moving to FIG. 3C, the magnetic recording head 360 does not include a HS or a bump. Instead, the notch 306 is disposed in contact with the trailing shield 312, or more specifically, the first notch interlayer 330a is disposed in contact with the trailing shield 312. In FIG. 3C, the first notch interlayer 330a disposed in contact with the trailing shield 312 has a first thickness 338a in the x-direction, and the second notch interlayer 330b disposed in between the first and second notch layers 332a, 332b has a second thickness 338b in the x-direction. The first thickness 338a and the second thickness 338b are each individually between about 0.5 nm to about 10 nm. In some embodiments, the first thickness 338a and the second thickness 338b are about equal. In the embodiment of FIG. 3C, the STO 318 is magnetically decoupled from the notch 306.

FIGS. 4A-4G illustrate cross-sectional views of magnetic recording heads, according to various embodiments. The magnetic recording heads 400, 470, 475, 480, 485, 490, 495 may independently be the write head 210 of FIG. 2. The magnetic recording heads 470, 475, 480, 485, 490, 495 are each within a magnetic recording device, such as the magnetic recording device 100 of FIG. 1. The magnetic recording heads 470, 475, 480, 485, 490, 495 of FIG. 4A-4G are all variations of the magnetic recording heads 300, 350, 360 of FIGS. 3A-3C. As such, the embodiments of FIGS. 4A-4G may be used in combination with the embodiments of FIGS. 3A-3C.

Each of the magnetic recording heads 400, 470, 475, 480, 485, 490, 495 of FIGS. 4A-4G comprises the main pole 310, the trailing shield 312, the trailing gap 316 disposed between the main pole 310 and the trailing shield 312, and the STO 318 disposed in the trailing gap 316 adjacent to the main pole 310. Each of the magnetic recording heads 400, 470, 475, 480, 485, 490, 495 comprises a MFS 304 facing a magnetic media 302. The STO 318 comprises the seed layer 328 disposed in contact with the main pole 310, the SPL 326 disposed in contact with the seed layer 328, the first SP1 324 comprising Cu disposed in contact with the SPL 326, the FGL 322 disposed in contact with the SPL1 324, and the second SP2 320 comprising Cu, Ru, Cr, or NiCr disposed in contact with the FGL 322.

In the magnetic recording heads 400, 470, 475, 480, 490, and 495 of FIGS. 4A-4D, 4F, and 4G, respectively, the trailing shield 312 comprises a trailing shield HS layer 414 disposed adjacent to the trailing gap 316. In the magnetic recording heads 400, 470, 480, 485, 490, and 495 of FIGS. 4A, 4B, and 4D-4G, respectively, a bump 408 is disposed between the trailing shield 312 and the main pole 310. In the magnetic recording heads 400, 470, 475, 480, 485, and 490 of FIGS. 4A-4F, respectively, a notch 406 is disposed between the main pole 310 and the trailing gap 316. In some embodiments, the HS layer 414 (if present), the bump 408 (if present), and/or the notch 406 are considered part of the trailing shield 312.

Similar to the embodiments of FIGS. 3A-3C, the notch 406 of FIGS. 4A-4E comprises one or more notch layers 432a, 432b and one or more notch interlayers 430a, 430b. In other words, the notch 406 comprises alternating layers materials. The one or more notch layers 432a, 432b and the one or more notch interlayers 430a, 430b are alternating, where a first notch layer 432a is disposed in contact with the STO 318 and a first notch interlayer 430a is disposed in contact with the bump 408 in FIGS. 4A, 4B, and 4D-4E, or the HS layer 414 in FIG. 4C. While two notch layers 432a, 432b and two notch interlayers 430a, 430b are shown in FIGS. 4A-4E, the notch 406 may comprise greater or fewer notch layers 432a, 432b and greater or fewer notch interlayers 430a, 430b. As such, the number of notch layers 432a, 432b and the number of notch interlayers 430a, 430b are not intended to be limiting.

The notch 406 of FIGS. 4A-4E may be the notch 306 of FIGS. 3A-3C. As such, the one or more notch interlayers 430a, 430b may be the one or more notch interlayers 330a, 330b of FIGS. 3A-3C, where the first notch interlayer 430a has either the first thickness 334a of FIG. 3A, the first thickness 336a of FIG. 3B, or the first thickness 338a of FIG. 3C, and the second notch interlayer 430b has either the second thickness 334b of FIG. 3A, the second thickness 336b of FIG. 3B, or the second thickness 338b of FIG. 3C. The HS layer 414 has the same second height 354 in the z-direction as the trailing shield 312. The notch 406 and the bump 408 (if present) each individually has the same first height 352 in the z-direction as the STO 318.

The one or more notch layers 432a, 432b each individually comprises a high moment ferromagnetic material, such as CoFe or NiFe. Each of the one or more notch layers 432a, 432b may comprise the same material or a different material. The one or more notch interlayers 430a, 430b each individually comprises a non-magnetic material having a thickness adjusted for strong (or alternatively weak) AF coupling, or a magnetic material. Each of the one or more notch interlayers 430a, 430b may comprise the same type of material (e.g., magnetic or non-magnetic). For example, the first and second notch interlayers 430a, 430b may each individually comprise a magnetic material, or a non-magnetic material having a thickness adjusted for strong (or alternatively weak) AF coupling strength. While the one or more notch interlayers 430a, 430b may comprise the same type of material (e.g., magnetic or non-magnetic), the one or more notch interlayers 430a, 430b may still comprises different materials of the same type.

Similarly, each of the one or more notch interlayers 430a, 430b may comprise a different type material. For example, the first notch interlayer 430a may comprise a non-magnetic material having a thickness adjusted for weak or zero AF coupling strength while the second notch interlayer 430b comprises a non-magnetic material having a thickness adjusted for strong AF coupling strength, or vice versa; the first notch interlayer 430a may comprise a non-magnetic material having a thickness adjusted for weak (or alternatively strong) AF coupling strength while the second notch interlayer 430b comprises a magnetic material, or vice versa; or the first notch interlayer 430a may comprise a magnetic material while the second notch interlayer 430b comprises a non-magnetic material having a thickness adjusted for weak (or alternatively strong) AF coupling strength, or vice versa.

Figure 4A:
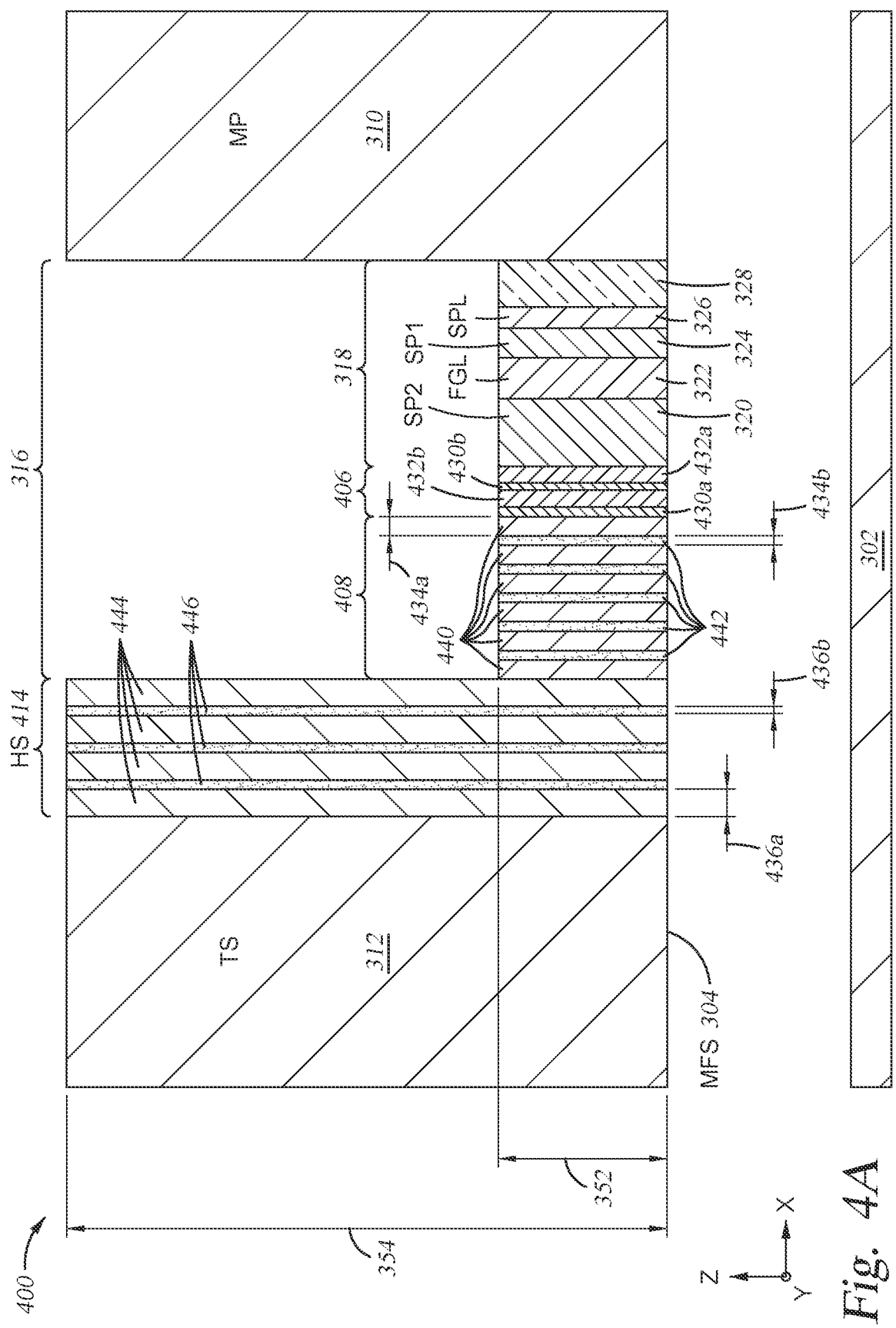

In the magnetic recording head 400 of FIG. 4A, the bump 408 comprises one or more bump layers 440 and one or more bump interlayers 442. The one or more bump layers 440 and the one or more bump interlayers 442 is alternating, where each of the one or more bump interlayers 442 are sandwiched between two bump layers 440. Thus, one bump layer 440 is disposed in contact with the notch 406 and one bump layer 440 is disposed in contact with the HS layer 414. While six bump layers 440 and five bump interlayers 442 are shown in FIG. 4A, the bump 408 may comprise any number of bump layers 440 and any number of bump interlayers 442. As such, the number of bump layers 440 and the number of bump interlayers 442 are not intended to be limiting.

Each of the one or more bump layers 440 individually comprises a high magnetic moment material, such as CoFe70. In some embodiments, the one or more bump layers 440 are doped with a rare earth metal, such as beta phase tantalum, beta phase tungsten, or platinum. In some embodiments, each of the one or more bump layers 440 has a first thickness 434a in the x-direction that is greater than a second thickness 434b in the x-direction of the one or more bump interlayers 442. The second thickness 434b of the one or more bump interlayers 442 is between about 0.5 nm to about 1 nm.

Each of the one or more bump interlayers 442 each individually comprises a non-magnetic material having a thickness adjusted for strong AF interaction strength. Each of the one or more bump interlayers 442 may comprise the same type of material (e.g., magnetic or non-magnetic). For example, each of the one or more bump interlayers 442 may each individually comprise a non-magnetic material or magnetic material (e.g., ferromagnetic bump). While the one or more bump interlayers 442 may comprise the same type of material, the one or more bump interlayers 442 may still comprises different materials of the same type.

Similarly, each of the one or more bump interlayers 442 may comprise a different type material. For example, one or more bump interlayers 442 may comprise a non-magnetic material while at least one other bump interlayer 442 comprises a magnetic material. In some embodiments, a purpose of the bump interlayers 442 is to help enable a SAF structure in the bump 408.

Similar to the bump 408, the HS layer 414 comprises one or more HS layers 444 and one or more HS interlayers 446. The one or more HS layers 444 and the one or more HS interlayers 446 are alternating, where each of the one or more HS interlayers 446 is sandwiched between two HS layers 444. Thus, one HS layer 444 is disposed in contact with the bump 408 and one HS layer 444 is disposed in contact with the TS 312. While four HS layers 444 and three HS interlayers 446 are shown in FIG. 4A, the HS layer 414 may comprise any number of HS layers 444 and any number of HS interlayers 446. As such, the number of HS layers 444 and the number of HS interlayers 446 are not intended to be limiting.

Each of the one or more HS layers 444 individually comprises a high magnetic moment material, such as CoFe70 or NiFe. In some embodiments, each of the one or more HS layers 444 has a first thickness 436a in the x-direction that is greater than a second thickness 436b in the x-direction of the one or more HS interlayers 446. The second thickness 436b of the one or more HS interlayers 446 is between about 0.5 nm to about 1 nm.

Each of the one or more HS interlayers 446 each individually comprises a non-magnetic material. Each of the one or more HS interlayers 446 may comprise the same type of material. For example, each of the one or more HS interlayers 446 may each individually comprise a non-magnetic material or each of the one or more HS interlayers 446 may each individually comprise a magnetic material. While the one or more HS interlayers 446 may comprise the same type of material, the one or more HS interlayers 446 may still comprise different materials of the same type.

Similarly, each of the one or more HS interlayers 446 may comprise a different type material. For example, one or more HS interlayers 446 may comprise a non-magnetic material while at least one other HS interlayer 446 comprises a magnetic material, or one or more HS interlayers 446 may comprise a non-magnetic material while at least one other HS interlayer 446 comprises a magnetic material. In another example, one or more HS interlayers 446 may comprise a magnetic material while the remaining interlayers may comprise a non-magnetic material, or vice versa. In some embodiments, a purpose of the HS interlayers 446 is to help enable a SAF structure in the HS 414.

Figure 4B:
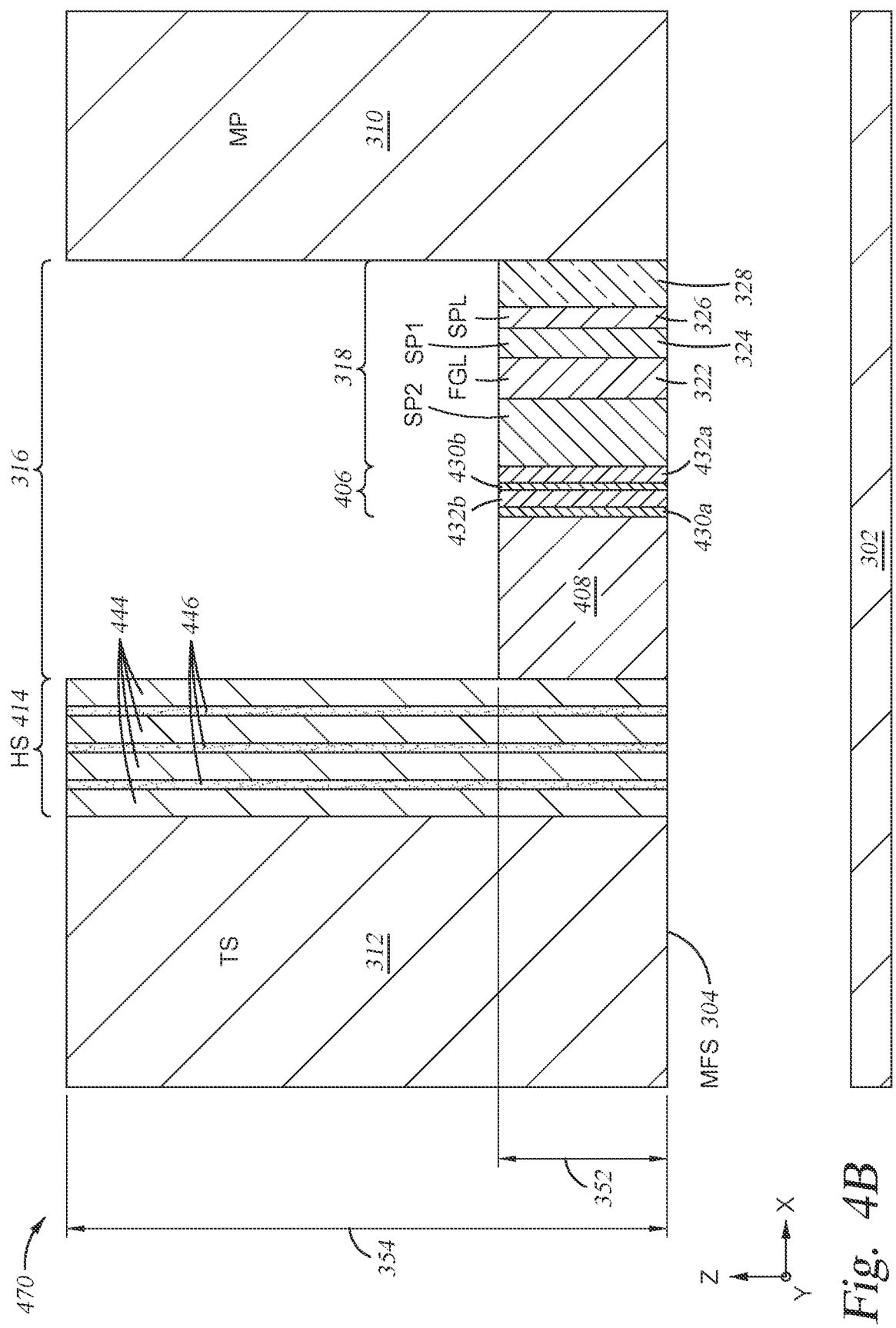

The magnetic recording head 470 of FIG. 4B is similar to the magnetic recording head 400 of FIG. 4A; however, in the magnetic recording head 470, the bump 408 does not comprise one or more bump interlayers 442. Instead, the bump 408 comprises a high magnetic moment material, such as CoFe alloys, for example. The HS layer 414 still comprises the one or more HS layers 444 and the one or more HS interlayers 446 discussed above in FIG. 4A. As such, the bump 408 is disposed in contact with the first notch interlayer 430a of the notch 406 and an HS layer 444 of the HS layer 414.

Figure 4C:
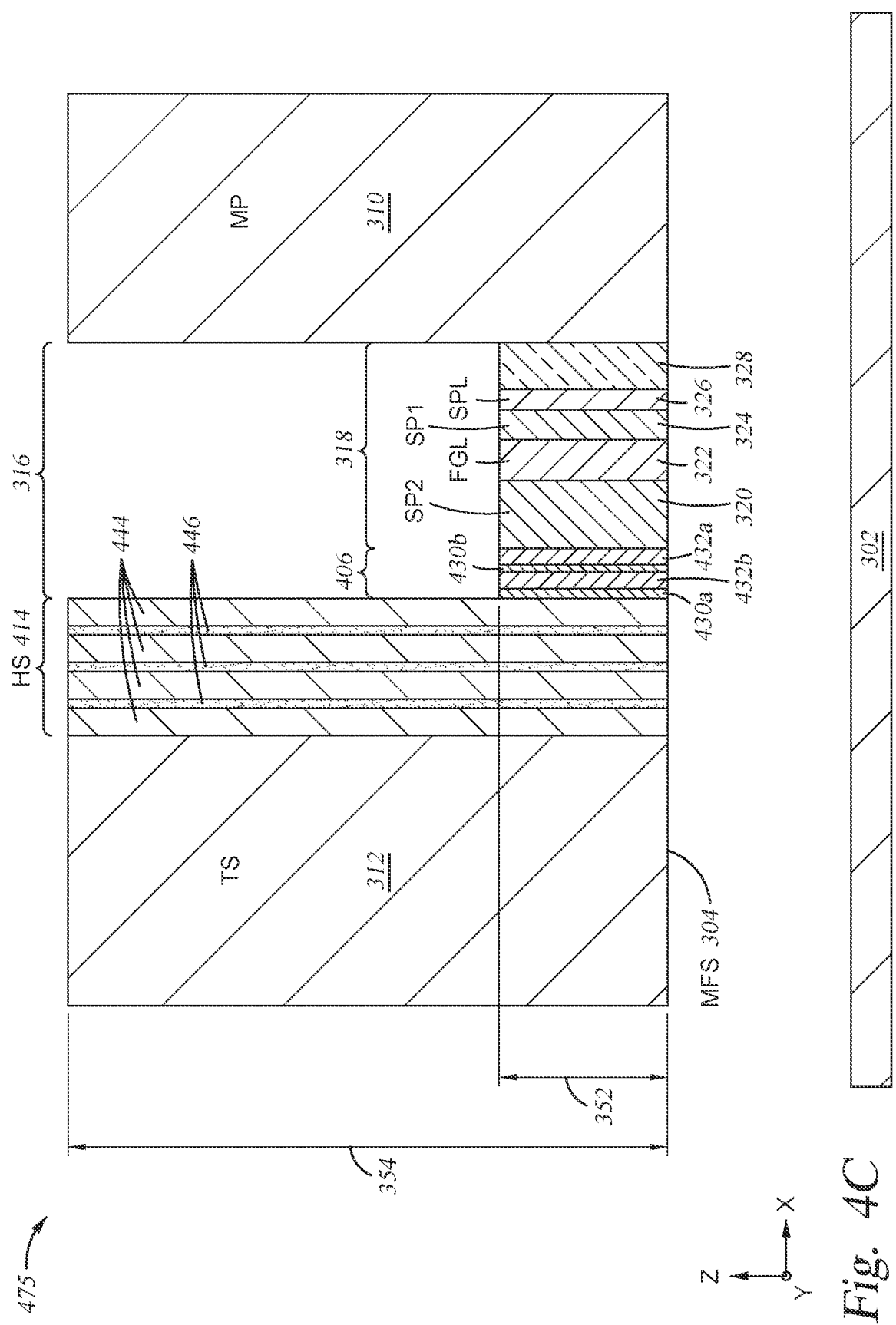

The magnetic recording head 475 of FIG. 4C is similar to the magnetic recording head 400 of FIG. 4A and the magnetic recording head 470 of FIG. 4B; however, the magnetic recording head 475 does not comprise a bump 408. The HS layer 414 still comprises the one or more HS layers 444 and the one or more HS interlayers 446 discussed above in FIG. 4A. As such, the first notch interlayer 430a of the notch 406 is disposed in contact with a HS layer 444 of the HS layer 414.

Figure 4D:
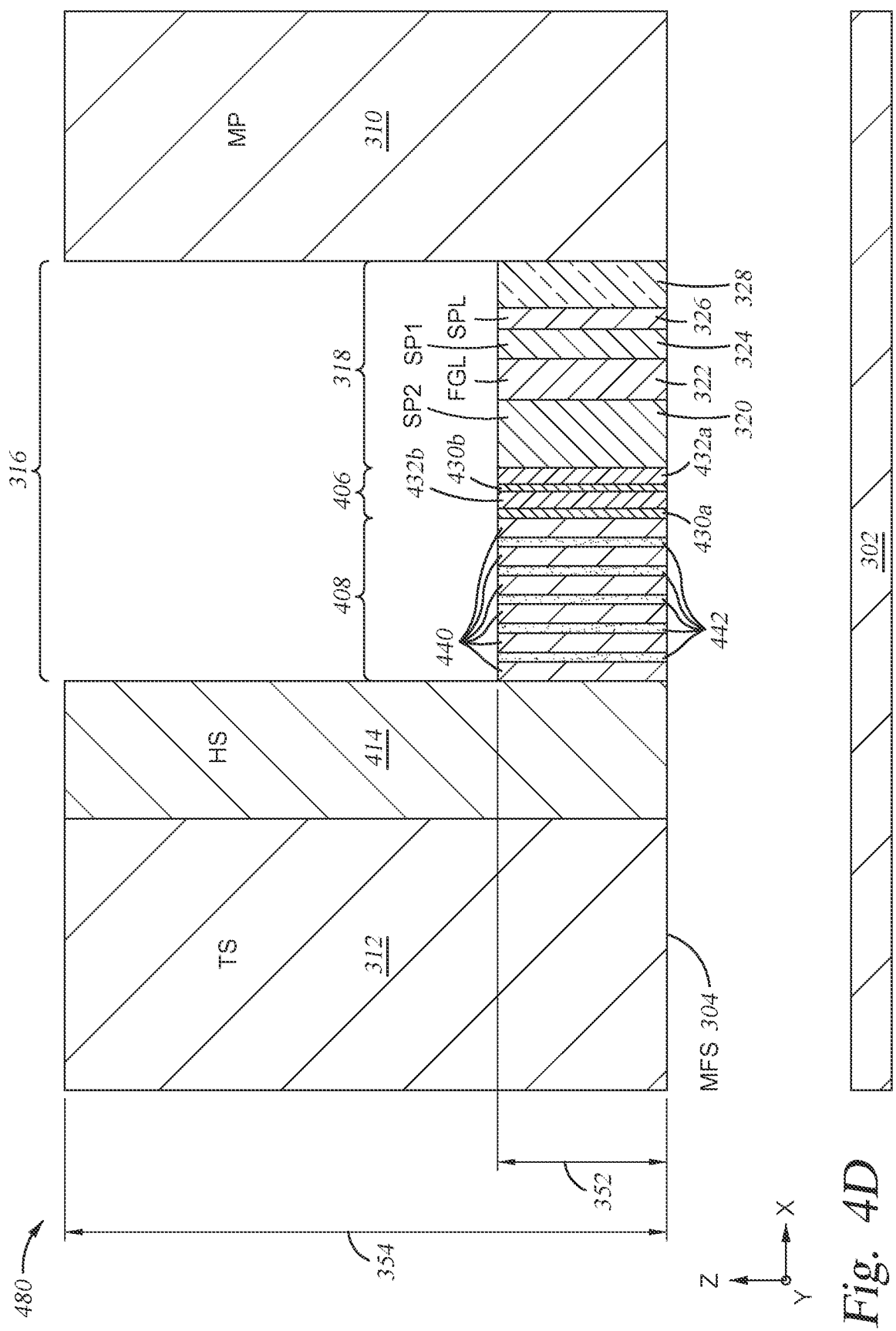

The magnetic recording head 480 of FIG. 4D is similar to the magnetic recording head 400 of FIG. 4A; however, in the magnetic recording head 480, the HS layer 414 does not comprise one or more HS interlayers 446. Instead, the HS layer 414 comprises a high magnetic moment material, such as CoFe alloys, for example. The bump 408 still comprises the one or more bump layers 440 and the one or more bump interlayers 442 discussed above in FIG. 4A. As such, the bump 408 is disposed in contact with the HS layer 414 and the first notch interlayer 430a of the notch 406.

Figure 4E:
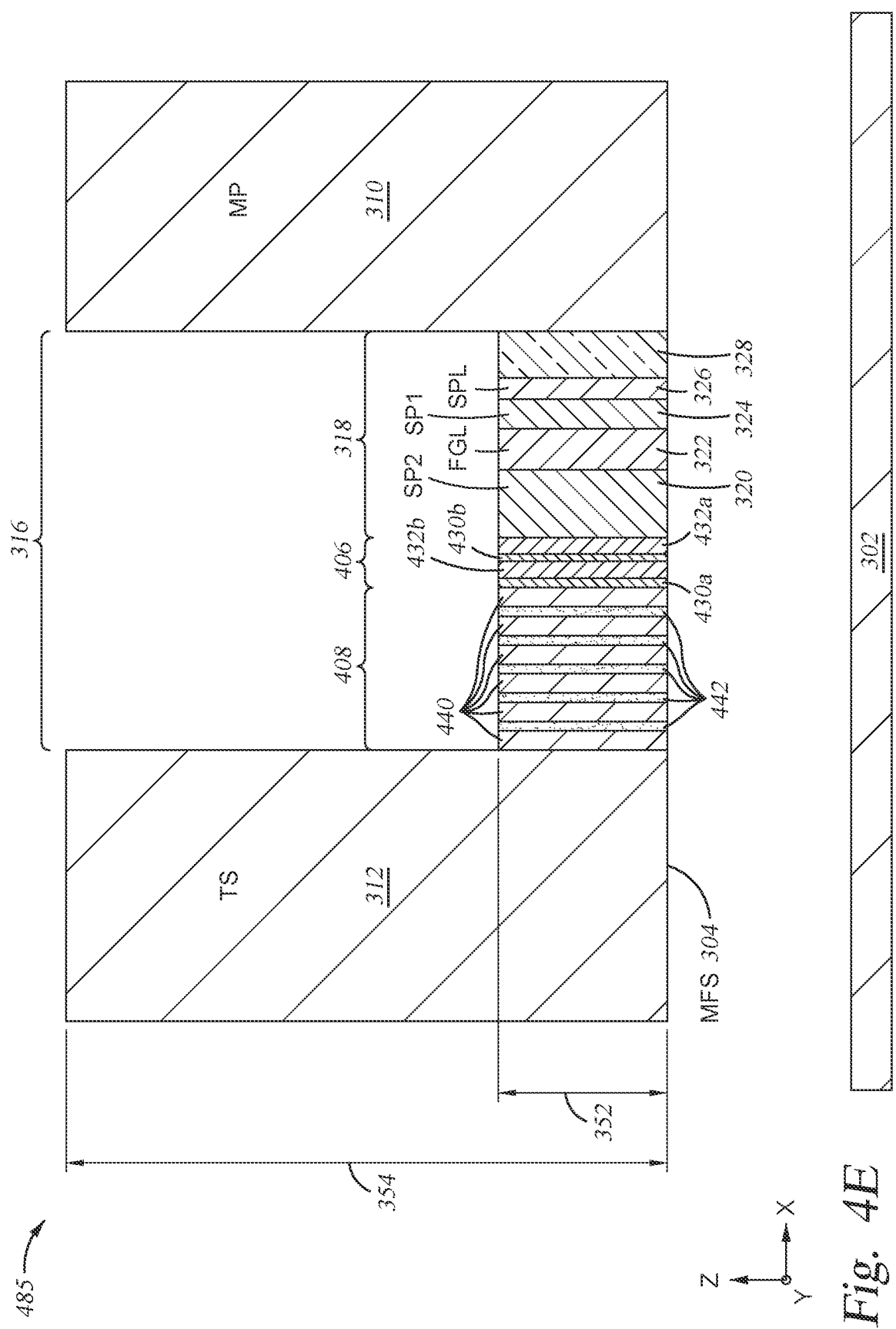

The magnetic recording head 485 of FIG. 4E is similar to the magnetic recording head 400 of FIG. 4A and the magnetic recording head 480 of FIG. 4D; however, the magnetic recording head 485 does not comprise a HS layer 414. The bump 408 still comprises the one or more bump layers 440 and the one or more bump interlayers 442 discussed above in FIG. 4A. As such, a bump layer 440 is disposed in contact with the trailing shield 312.

Figure 4F:
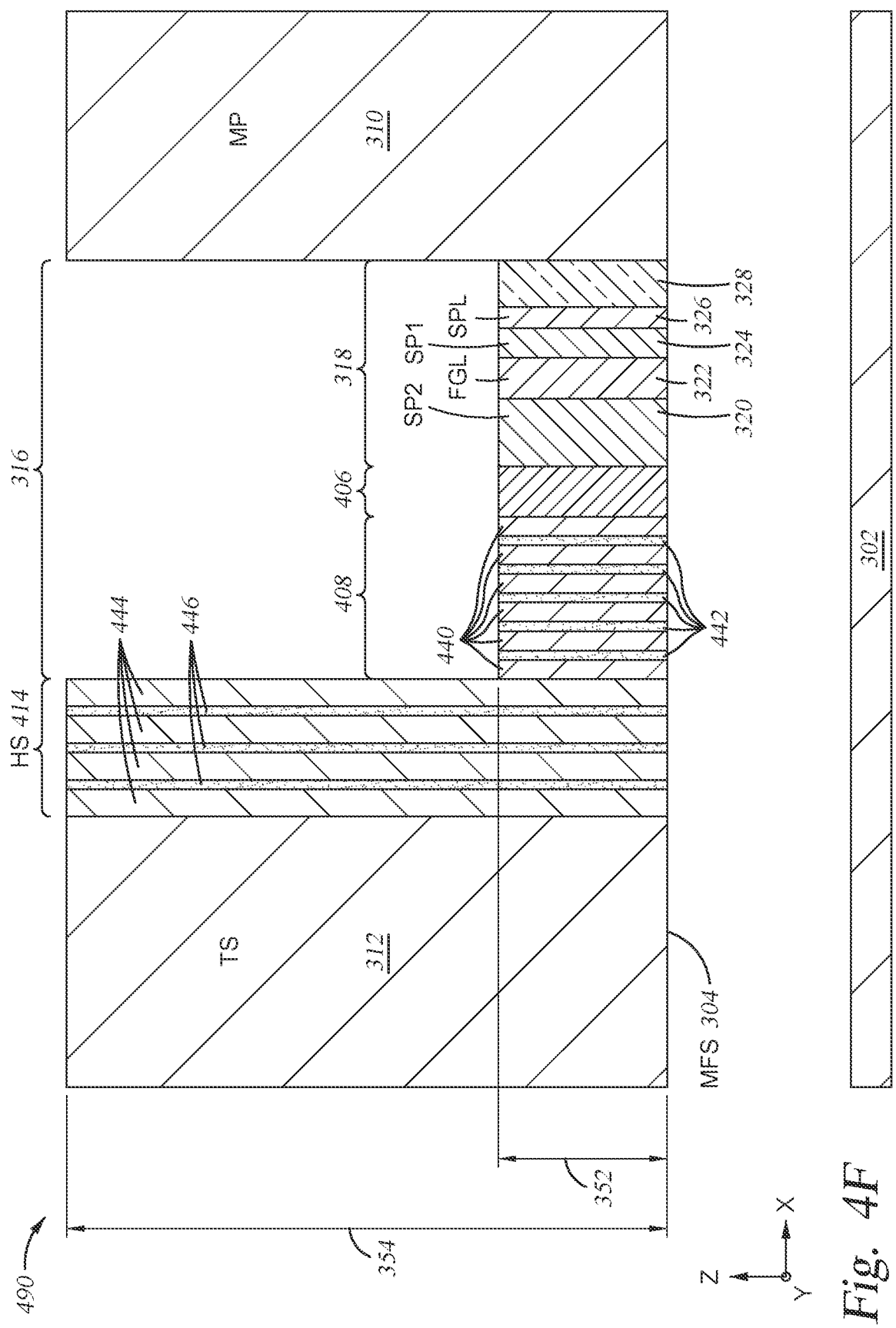

The magnetic recording head 490 of FIG. 4F is similar to the magnetic recording head 400 of FIG. 4A; however, the notch 406 of the magnetic recording head 490 does not comprise one or more notch interlayers 430a, 430b. Instead, the notch 406 comprises a high moment ferromagnetic material, such as CoFe. In some embodiments, the HS layer 414 of the magnetic recording head 490 does not comprise the one or more HS interlayers 446, like the magnetic recording head 480 of FIG. 4D. In other embodiments, the bump 408 of the magnetic recording head 490 does not comprise the one or more bump interlayers 442, like the magnetic recording head 470 of FIG. 4B.

Figure 4G:
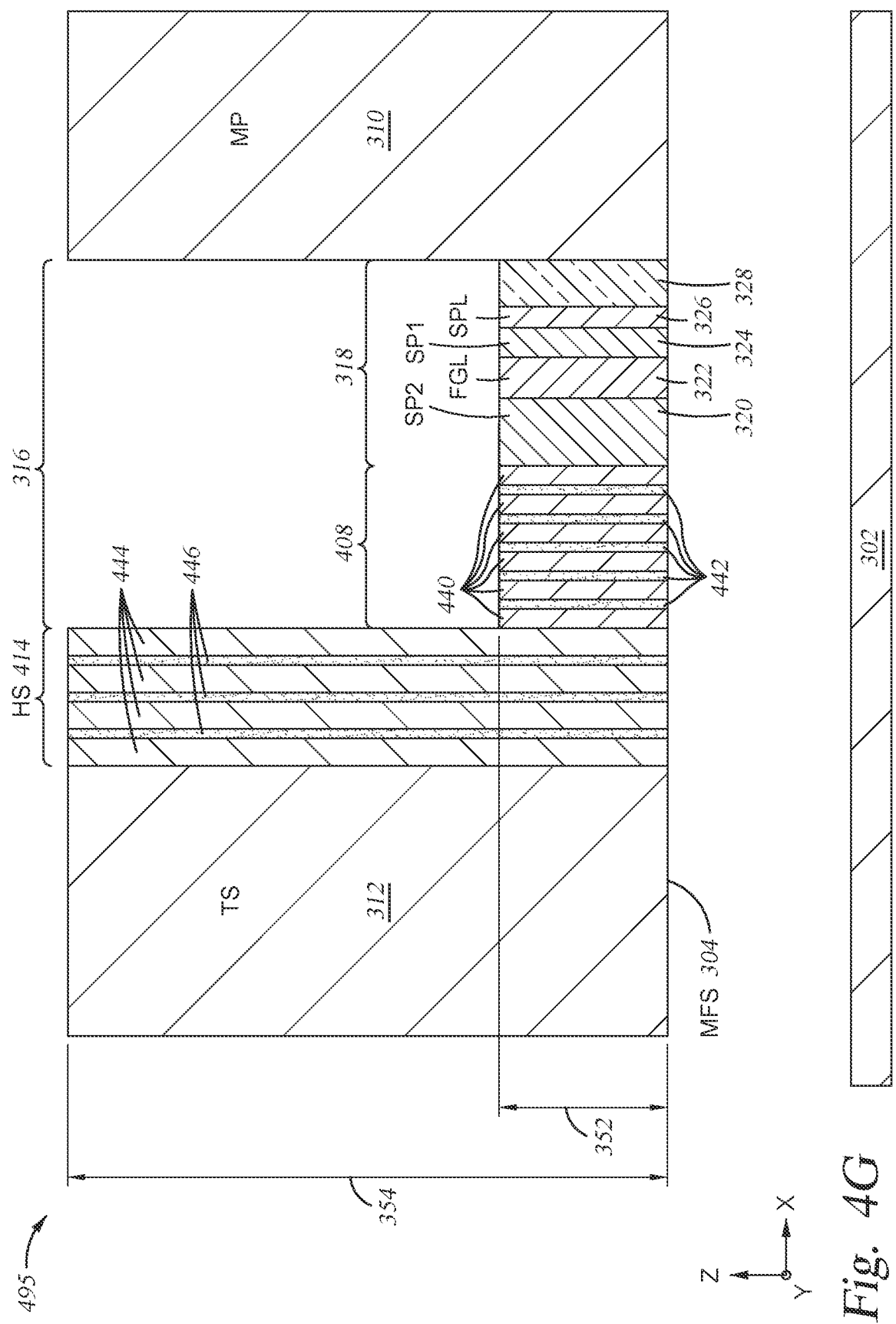

The magnetic recording head 495 of FIG. 4G is similar to the magnetic recording head 400 of FIG. 4A; however, the magnetic recording head 495 does not comprise a notch 406. Instead, the STO 318 is disposed in contact with the bump 408. In some embodiments, the HS layer 414 of the magnetic recording head 495 does not comprise the one or more HS interlayers 446, like the magnetic recording head 480 of FIG. 4D. In other embodiments, the bump 408 of the magnetic recording head 495 does not comprise the one or more bump interlayers 442, like the magnetic recording head 470 of FIG. 4B.

By including one or more interlayers in one or more of the notch, the HS layer, and the bump, oscillations of the magnetization in the trailing shield is suppressed, and the gap field can be reduced for narrow trailing gap designs. Furthermore, the one or more interlayers result in a reduction of the FGL of the STO to writer interaction, as well as an improved FGL angle. A purpose of the notch interlayers, the bump interlayers, and/or the HS interlayers is to help enable a SAF structure in the notch, and/or bump, and/or hot seed, respectively. As such, the writing capabilities of a magnetic recording head comprising the one or more interlayers in one or more of the notch, the HS layer, and the bump are improved.

In one embodiment, a magnetic recording head comprises a main pole, a trailing shield, a trailing gap disposed between the main pole and the trailing shield, a spin torque oscillator disposed adjacent to the main pole in the trailing gap, and a notch disposed between the spin torque oscillator and the trailing shield in the trailing gap, the notch comprising one or more notch interlayers and one or more notch layers, wherein the one or more notch interlayers each individually comprise a non-magnetic material, or a magnetic material. The one or more notch layers comprise a different material than the one or more notch interlayers.

The one or more notch layers and the one or more notch interlayers are alternating. Each of the one or more notch interlayers has a thickness in a first direction of about 0.5 nm to about 10 nm. A first notch interlayer of the one or more notch interlayers has a greater thickness in a first direction than a second notch interlayer of the one or more notch interlayers. The magnetic recording head further comprises a hot seed layer coupled to the trailing shield adjacent to the trailing gap, and a bump disposed between the hot seed layer and the notch. The bump comprises one or more bump layers comprising a high magnetic moment material and one or more bump interlayers comprising a non-magnetic material. The hot seed layer comprises one or more hot seed layers comprising a high magnetic moment material and one or more hot seed interlayers comprising a non-magnetic material.

In another embodiment, a magnetic recording head comprises a main pole, a trailing shield, a trailing gap disposed between the main pole and the trailing shield, a spin torque oscillator disposed adjacent to the main pole in the trailing gap at a media facing surface (MFS), and a hot seed layer coupled to the trailing shield adjacent to the trailing gap, the hot seed layer comprising one or more hot seed interlayers and one or more hot seed layers, wherein the one or more hot seed interlayers each individually comprise a non-magnetic material, and wherein each of the one or more hot seed layers comprise a high magnetic moment material.

The one or more hot seed interlayers comprise CoFe or NiFe. The magnetic recording head further comprises a bump disposed between the hot seed layer and the spin torque oscillator, the bump comprising one or more bump layers comprising a high magnetic moment material and one or more bump interlayers comprising a non-magnetic material. The hot seed layer has a first height extending from the MFS into the magnetic recording head greater than a second height of the bump. The one or more hot seed interlayers and the one or more bump interlayers comprise the same material. The magnetic recording head further comprises a notch disposed between the hot seed layer and the spin torque oscillator, the notch comprises one or more notch interlayers and one or more notch layers, wherein the one or more notch layers comprise a different material than the one or more notch interlayers.

In yet another embodiment, a magnetic recording head comprises a main pole, a trailing shield, a trailing gap disposed between the main pole and the trailing shield, a spin torque oscillator disposed adjacent to the main pole in the trailing gap, a notch disposed adjacent to the spin torque oscillator in the trailing gap, the notch comprising anon-magnetic material, and a bump disposed between the notch and the spin torque oscillator in the trailing gap, the bump comprising one or more bump interlayers alternating with one or more bump layers, wherein the one or more bump interlayers each individually comprises a non-magnetic material, and wherein the one or more bump layers comprise a different material than the one or more bump interlayers.

The notch comprises one or more notch interlayers and one or more notch layers, wherein the one or more notch layers each individually comprises the non-magnetic material, and wherein the one or more notch interlayers each individually comprises a magnetic material. A first notch interlayer of the one or more notch interlayers comprises a different material than a second notch interlayer of the one or more notch interlayers. The one or more bump layers are doped with a rare earth metal. The magnetic recording head further comprises a hot seed layer disposed between the bump and the trailing shield, the hot seed layer having a first height extending from a media facing surface into the magnetic recording head greater than a second height of the bump and a third height of the notch. The second height of the bump is about equal to the third height of the notch.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole having a first height extending from a media facing surface (MFS) into the magnetic recording head;
   a trailing shield;
   a trailing gap disposed between the main pole and the trailing shield;
   a hot seed layer coupled to the trailing shield, the hot seed layer having a second height extending from the MFS into the magnetic recording head, wherein the hot seed layer comprises one or more hot seed interlayers and one or more hot seed layers;
   a spin torque oscillator disposed in contact with the main pole in the trailing gap, the spin torque oscillator having a third height less than the first height at a point of contact with the main pole; and
   a notch disposed between the spin torque oscillator and the hot seed layer in the trailing gap, the notch comprising:
      one or more notch interlayers; and
      one or more notch layers,
      wherein the one or more notch interlayers each individually comprise a non-magnetic material or a magnetic material,
      wherein the one or more notch layers comprise a different material than the one or more notch interlayers, and
      wherein the notch has a fourth height extending from the MFS into the magnetic recording head less than the second height of the hot seed layer.

2. The magnetic recording head of claim 1, wherein the one or more notch layers and the one or more notch interlayers are alternating.

3. The magnetic recording head of claim 1, wherein each of the one or more notch interlayers has a thickness in a first direction of about 0.5 nm to about 10 nm.

4. The magnetic recording head of claim 1, wherein a first notch interlayer of the one or more notch interlayers has a greater thickness in a first direction than a second notch interlayer of the one or more notch interlayers.

5. The magnetic recording head of claim 1, further comprising:
a bump disposed between the hot seed layer and the notch.

6. The magnetic recording head of claim 5, wherein the bump comprises one or more bump layers comprising a high magnetic moment material and one or more bump interlayers comprising a non-magnetic material.

7. The magnetic recording head of claim 1, wherein the one or more hot seed layers comprise a high magnetic moment material and the one or more hot seed interlayers comprise a non-magnetic material.

8. A magnetic recording device comprising the magnetic recording head of claim 1.

9. A magnetic recording head, comprising:
a main pole having a first height extending from a media facing surface (MFS) into the magnetic recording head;
a trailing shield;
a trailing gap disposed between the main pole and the trailing shield;
a spin torque oscillator disposed in contact with the main pole in the trailing gap, the spin torque oscillator having a second height extending from the MFS into the magnetic recording head less than the first height at a point of contact with the main pole; and
a hot seed layer coupled to the trailing shield adjacent to the trailing gap, the hot seed layer having a third height extending from the MFS into the magnetic recording head substantially equal to the first height, the hot seed layer comprising:
one or more hot seed interlayers; and
one or more hot seed layers,
wherein the one or more hot seed interlayers each individually comprise a non-magnetic material, and
wherein each of the one or more hot seed layers comprise a high magnetic moment material.

10. The magnetic recording head of claim 9, wherein the one or more hot seed layers comprise CoFe or NiFe.

11. A magnetic recording head, comprising:
a main pole having a first height extending from a media facing surface (MFS) into the magnetic recording head;
a trailing shield;
a trailing gap disposed between the main pole and the trailing shield;
a spin torque oscillator disposed in contact with the main pole in the trailing gap, the spin torque oscillator having a second height extending from the MFS into the magnetic recording head less than the first height at a point of contact with the main pole;
a hot seed layer coupled to the trailing shield adjacent to the trailing gap, the hot seed layer having a third height extending from the MFS into the magnetic recording head greater than the second height of the spin torque oscillator, the hot seed layer comprising:
one or more hot seed interlayers; and
one or more hot seed layers,
wherein the one or more hot seed interlayers each individually comprise a non-magnetic material, and
wherein each of the one or more hot seed layers comprise a high magnetic moment material; and
a bump disposed between the hot seed layer and the spin torque oscillator, the bump comprising one or more bump layers comprising a high magnetic moment material and one or more bump interlayers comprising a non-magnetic material.

12. The magnetic recording head of claim 11, wherein the third height of the hot seed layer is greater than a fourth height of the bump.

13. The magnetic recording head of claim 11, wherein the one or more hot seed interlayers and the one or more bump interlayers comprise the same material.

14. A magnetic recording head, comprising:
a main pole having a first height extending from a media facing surface (MFS) into the magnetic recording head;
a trailing shield;
a trailing gap disposed between the main pole and the trailing shield;
a spin torque oscillator disposed in contact with the main pole in the trailing gap, the spin torque oscillator having a second height extending from the MFS into the magnetic recording head less than the first height at a point of contact with the main pole;
a hot seed layer coupled to the trailing shield adjacent to the trailing gap, the hot seed layer having a third height extending from the MFS into the magnetic recording head greater than the second height of the spin torque oscillator, the hot seed layer comprising:
one or more hot seed interlayers; and
one or more hot seed layers,
wherein the one or more hot seed interlayers each individually comprise a non-magnetic material, and
wherein each of the one or more hot seed layers comprise a high magnetic moment material; and
a notch disposed between the hot seed layer and the spin torque oscillator, the notch comprises one or more notch interlayers and one or more notch layers, wherein the one or more notch layers comprise a different material than the one or more notch interlayers.

15. A magnetic recording device comprising the magnetic recording head of claim 9.

16. A magnetic recording head, comprising:
a main pole;
a trailing shield;
a trailing gap disposed between the main pole and the trailing shield;
a spin torque oscillator disposed adjacent to the main pole in the trailing gap;
a notch disposed adjacent to the spin torque oscillator in the trailing gap, the notch comprising a non-magnetic material; and
a bump disposed between the notch and the spin torque oscillator in the trailing gap, the bump comprising one or more bump interlayers alternating with one or more bump layers, wherein the one or more bump interlayers each individually comprises a non-magnetic material, and wherein the one or more bump layers comprise a different material than the one or more bump interlayers, the one or more bump layers being doped with a rare earth metal.

17. The magnetic recording head of claim 16, wherein the notch comprises one or more notch interlayers and one or more notch layers, wherein the one or more notch layers each individually comprises the non-magnetic material, and wherein the one or more notch interlayers each individually comprises a magnetic material.

18. The magnetic recording head of claim 17, wherein a first notch interlayer of the one or more notch interlayers comprises a different material than a second notch interlayer of the one or more notch interlayers.

19. The magnetic recording head of claim 16, further comprising:
- a hot seed layer disposed between the bump and the trailing shield, the hot seed layer comprising:
  - one or more hot seed layers each individually comprising a high magnetic moment material; and
  - one or more hot seed interlayers each individually comprising a non-magnetic material.

20. The magnetic recording head of claim 16, further comprising:
- a hot seed layer disposed between the bump and the trailing shield, the hot seed layer having a first height extending from a media facing surface into the magnetic recording head greater than a second height of the bump and a third height of the notch.

21. The magnetic recording head of claim 20, wherein the second height of the bump is about equal to the third height of the notch.

22. A magnetic recording device comprising the magnetic recording head of claim 16.

* * * * *